(12) United States Patent
Schukalski

(10) Patent No.: US 9,487,113 B2
(45) Date of Patent: Nov. 8, 2016

(54) VEHICLE SEAT WITH AN ACTUATING ELEMENT COUPLED WITH A FITTING LEVER VIA A COUPLING ELEMENT

(71) Applicant: Brose Fahrzeugteile GmbH & Co. KG, Coburg, Coburg (DE)

(72) Inventor: Juergen Schukalski, Kueps (DE)

(73) Assignee: BROSE FAHRZEUGTEILE GmbH & CO. KG, COBURG, Coburg (DE)

( * ) Notice: Subject to any disclaimer, the term of this patent is extended or adjusted under 35 U.S.C. 154(b) by 125 days.

(21) Appl. No.: 14/506,369

(22) Filed: Oct. 3, 2014

(65) Prior Publication Data

US 2015/0108808 A1 Apr. 23, 2015

(30) Foreign Application Priority Data

Oct. 17, 2013 (DE) .......................... 10 2013 221 132

(51) Int. Cl.
| | |
|---|---|
| *B60N 2/06* | (2006.01) |
| *B60N 2/12* | (2006.01) |
| *B60N 2/22* | (2006.01) |
| *B60N 2/36* | (2006.01) |
| *B60N 2/44* | (2006.01) |

(52) U.S. Cl.
CPC ............. *B60N 2/442* (2013.01); *B60N 2/06* (2013.01); *B60N 2/12* (2013.01); *B60N 2/22* (2013.01); *B60N 2/36* (2013.01); *B60N 2002/445* (2013.01)

(58) Field of Classification Search
CPC ..... B60N 2/12; B60N 2/14; B60N 2002/445
USPC ........ 297/316, 317, 378.1, 340, 363, 362.12, 297/376
See application file for complete search history.

(56) References Cited

U.S. PATENT DOCUMENTS

| | | | | | |
|---|---|---|---|---|---|
| 4,822,101 | A | * | 4/1989 | Hosoe ...................... | B60N 2/12 297/341 |
| 6,152,533 | A | * | 11/2000 | Smuk ....................... | B60N 2/12 297/341 |
| 8,616,647 | B2 | * | 12/2013 | Chen ....................... | B62B 9/104 280/47.38 |
| 8,960,800 | B2 | * | 2/2015 | Champ ................. | B60N 2/3011 296/65.09 |
| 2004/0113473 | A1 | * | 6/2004 | Kojima .................... | B60N 2/12 297/341 |
| 2005/0110323 | A1 | * | 5/2005 | Hofmann ............. | B60N 2/2245 297/378.1 |
| 2010/0133886 | A1 | * | 6/2010 | Gi ...................... | B60N 2/01508 297/341 |

(Continued)

FOREIGN PATENT DOCUMENTS

| | | |
|---|---|---|
| DE | 102 61 689 A1 | 7/2004 |
| DE | 103 53 242 B3 | 7/2005 |

(Continued)

*Primary Examiner* — Timothy J Brindley
(74) *Attorney, Agent, or Firm* — Lewis Roca Rothgerber Christie LLP

(57) ABSTRACT

A vehicle seat comprises a seat part, a backrest part and a least one fitting which connects the backrest part with the seat part pivotally about a pivot axis and in a locked condition is formed to hold the backrest part in position to the seat part, and in an unlocked condition is formed to permit pivoting of the backrest part relative to the seat part. For actuating the at least one fitting, a first actuating element and a second actuating element different from the first actuating element are provided. Via a coupling element, the second actuating element is coupled with a fitting lever, wherein by shifting the second actuating element the fitting lever is movable for actuating the at least one fitting. The coupling element and the fitting lever are coupled with each other via a first connecting means and a second connecting means.

18 Claims, 6 Drawing Sheets

(56) References Cited

U.S. PATENT DOCUMENTS

| | | | | |
|---|---|---|---|---|
| 2010/0207440 A1* | 8/2010 | Hayakawa | | B60N 2/206 297/378.14 |
| 2011/0148164 A1* | 6/2011 | Oori | | B60N 2/12 297/344.1 |
| 2012/0228913 A1* | 9/2012 | Hurst | | B60N 2/12 297/354.12 |
| 2012/0261964 A1* | 10/2012 | Yamaguchi | | B60N 2/12 297/378.14 |
| 2013/0057041 A1* | 3/2013 | Ngiau | | B60N 2/12 297/354.12 |
| 2013/0147250 A1* | 6/2013 | Kim | | B60N 2/12 297/353 |
| 2014/0035340 A1* | 2/2014 | Sollars | | B60N 2/2236 297/362.11 |
| 2015/0202996 A1* | 7/2015 | Kajale | | B60N 2/206 297/363 |
| 2016/0016486 A1* | 1/2016 | Aktas | | B60N 2/20 297/378.12 |

FOREIGN PATENT DOCUMENTS

| | | |
|---|---|---|
| DE | 10 2004 030 320 B4 | 2/2006 |
| DE | 10 2008 028 102 A1 | 12/2009 |
| DE | 10 2008 047 660 A1 | 4/2010 |
| WO | WO 2011/143759 A1 | 11/2011 |
| WO | WO 2012/022767 A1 | 2/2012 |

* cited by examiner

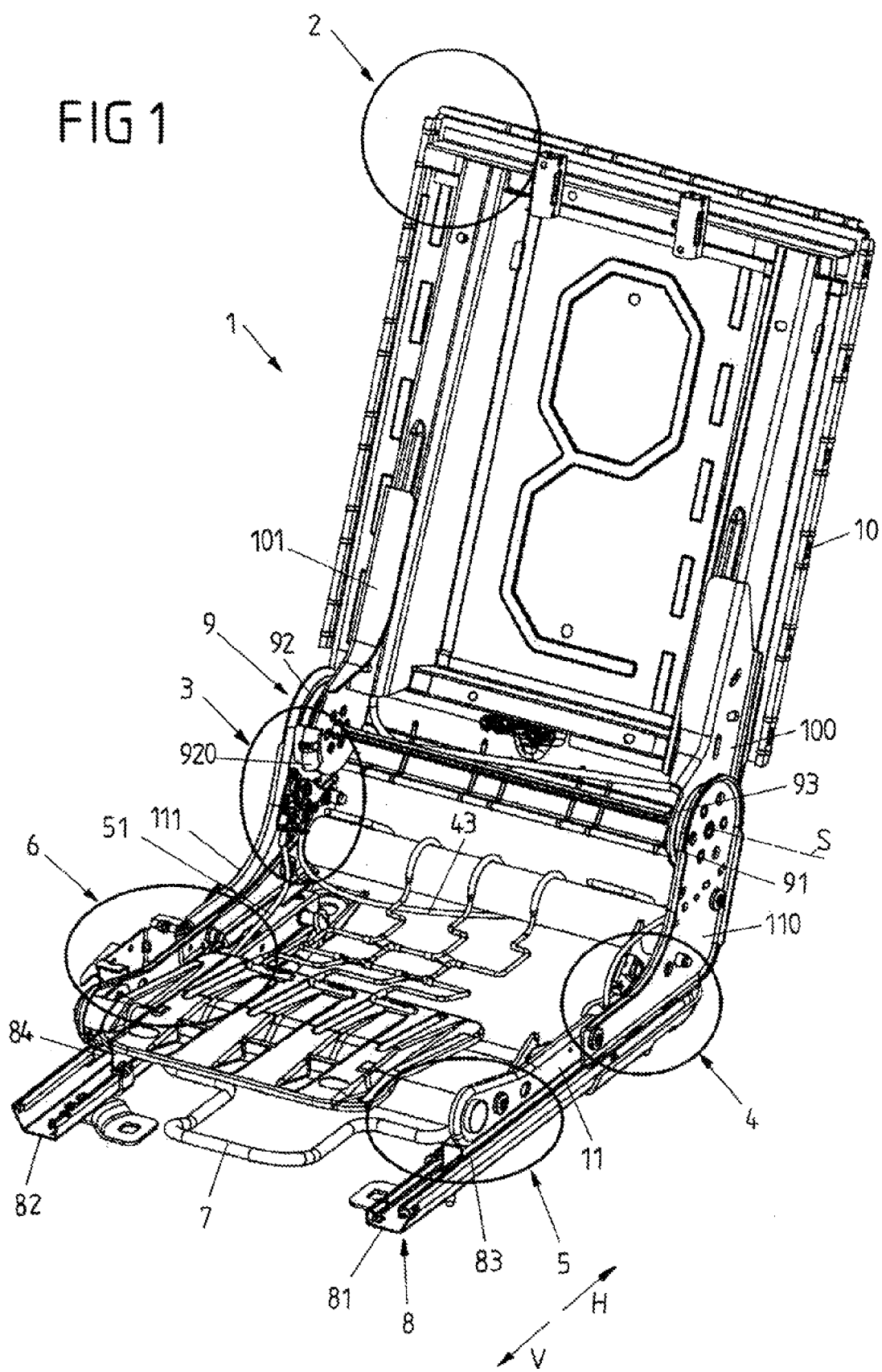

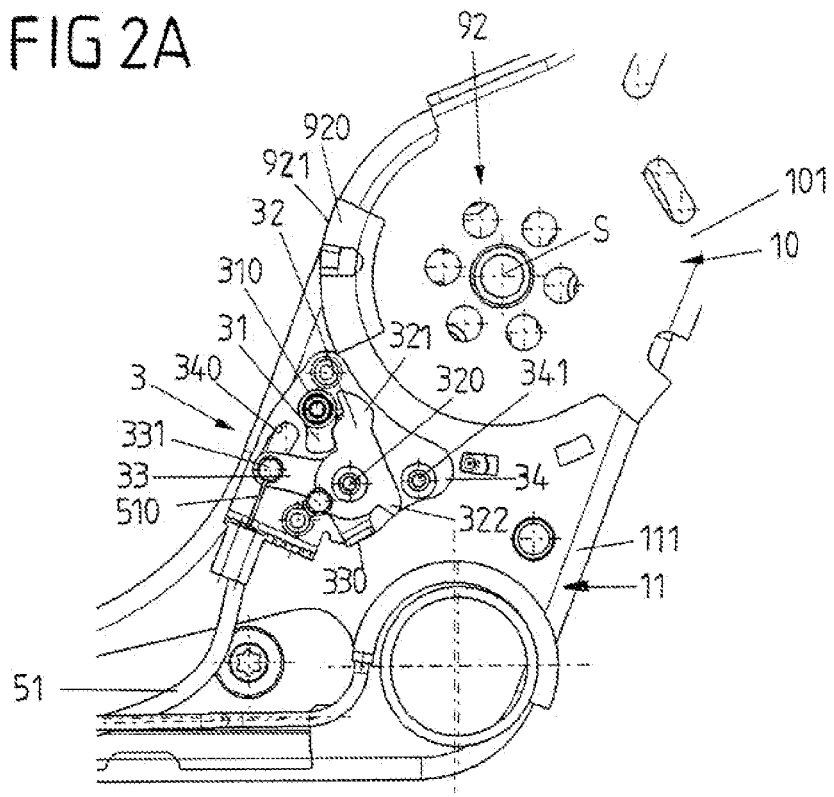
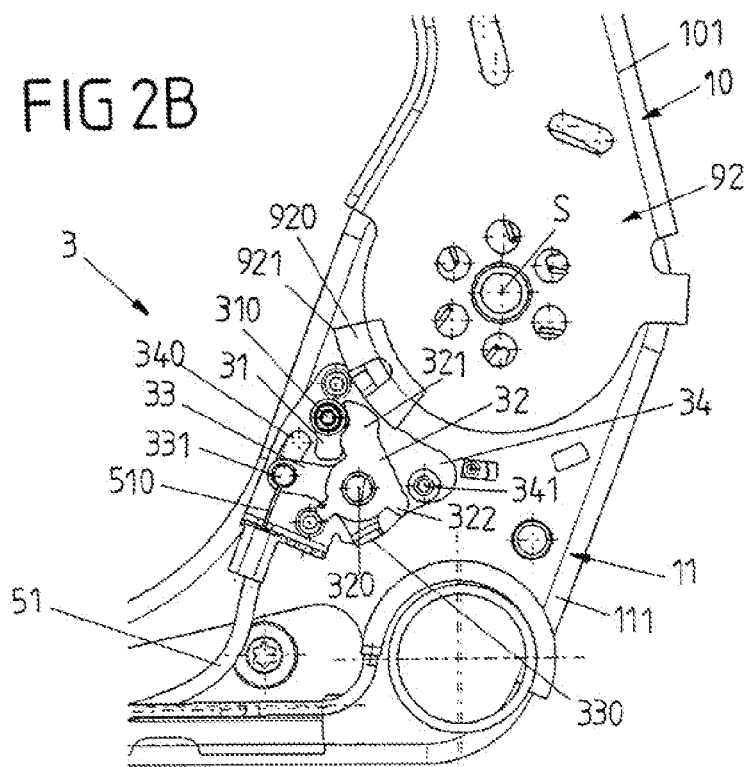

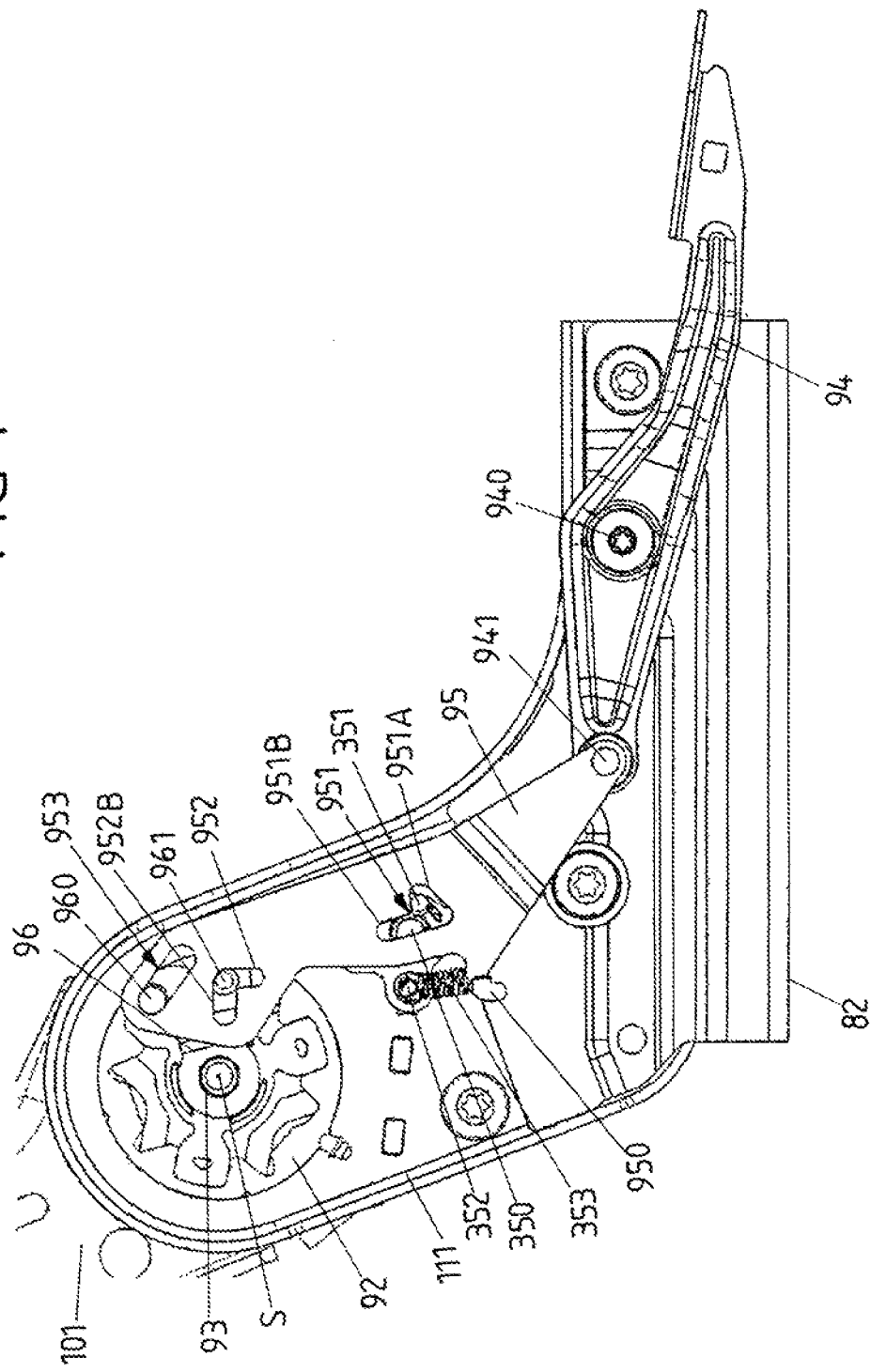

VEHICLE SEAT WITH AN ACTUATING ELEMENT COUPLED WITH A FITTING LEVER VIA A COUPLING ELEMENT

CROSS-REFERENCE TO RELATED APPLICATION

This application claims priority to German Patent Application No. 10 2013 221 132.5 filed on Oct. 17, 2013, the entirety of which is incorporated by reference herein.

BACKGROUND

The invention relates to a vehicle seat.

Such vehicle seat comprises a seat part, a backrest part and a least one fitting which connects the backrest part with the seat part pivotally about a pivot axis and in a locked condition is formed to hold the backrest part in position to the seat part, and in an unlocked condition is formed to permit pivoting of the backrest part relative to the seat part. A first actuating element and a second actuating element different from the first actuating element are provided for actuating the at least one fitting. On the at least one fitting a fitting lever is mounted, wherein the second actuating element is coupled with the fitting lever via a coupling element, and by shifting the second actuating element the fitting lever is movable for actuating the at least one fitting.

In a manner known per se, the fitting can be formed as detent fitting or as rotary fitting and provides for pivoting of the backrest part relative to the seat part for the purpose of adjusting the backrest inclination.

When there is provided a detent fitting using for example locking bolts of the type known from DE 10 2008 047 660 A1, the fitting in a locked condition holds the backrest part in position to the seat part and in an unlocked condition provides for freely pivoting the backrest part relative to the seat part, in order to adjust the backrest inclination or to bring the backrest part into a forward-pivoted position in connection with a so-called easy-entry function, in which a space behind the vehicle seat is increased for example for the purpose of a facilitated access to a further seat arranged behind the vehicle seat.

When there is provided a rotary fitting for example in the manner of a wobble gear transmission as it is known from DE 10 2008 028 102 A1, an additional unlocking means of the rotary fitting is present to provide an easy-entry function, which decouples the rotary fitting from the backrest part or from the seat part, so that in an unlocked condition the backrest part can freely be pivoted with respect to the seat part.

In connection with an easy-entry function of the vehicle seat, the backrest part is brought into a forward-pivoted position with respect to the seat part, and at the same time the vehicle seat is brought into a front position via a longitudinal adjustment means, via which the vehicle seat is longitudinally shiftably arranged for example on a vehicle floor, so that an easy and convenient access to a seat located behind the vehicle seat is made possible for a user. To provide the easy-entry function, an easy-entry actuating unit, for example in the form of an actuating lever, is provided at an upper end of the backrest part, which can be actuated for unlocking the at least one fitting and for actuating the longitudinal adjustment means. By means of the easy-entry actuating unit, a user can pivot the backrest part forwards with a handle and at the same time move the vehicle seat into a front position, so that the space behind the vehicle seat is increased.

In a vehicle seat known from DE 10 2004 030 320 B4, an easy-entry actuating unit is coupled with a detent fitting via a Bowden cable, and via a further Bowden cable with a longitudinal adjustment means of the vehicle seat. Upon actuation of the easy-entry actuating unit, the detent fitting on the one hand and the longitudinal adjustment means on the other hand are unlocked via these two Bowden cables, so that the backrest part is pivoted into a so-called easy-entry position folded forwards and the vehicle seat can be shifted into a front position.

In a vehicle seat known from DE 103 53 242 B3, an easy-entry actuating unit arranged on a backrest part is connected with a driving lever pivotally arranged on the backrest part via an arm of the Bowden cable and is connected with a detent fitting via another arm of the Bowden cable. Upon actuation of the easy-entry actuating unit, the detent fitting is unlocked and the driving lever on the backrest part is pivoted into a position in which on pivoting of the backrest part it gets into engagement with a driver plate arranged concentrically to the detent fitting and entrains the same. On the driver plate a Bowden cable is arranged, which couples the driver plate with a longitudinal adjustment means and on forward-pivoting of the backrest part unlocks the longitudinal adjustment means.

In particular when providing an easy-entry function in a rear seat, i.e. in a vehicle seat arranged in the second row in a vehicle, for example in a vehicle having three rows, there are required robust actuating mechanisms of simple construction for providing the easy-entry function, which provide for forward-pivoting of a backrest in combination with a forward-shifting of the vehicle seat for facilitating the access behind the vehicle seat. Conventional mechanisms have a comparatively complex construction, require a large number of components and in particular in existing vehicle seats cannot easily be retrofitted or be integrated into existing concepts.

In a vehicle seat known from WO 2012/022 767 A1, there is provided a control unit with a control lever arranged on the seat part, which is shiftable between a passive position and an active position and for actuating a longitudinal adjustment means is coupled with the longitudinal adjustment means to provide an easy-entry function. In addition, a driver stop is arranged on the backrest part, which during pivoting of the backrest part enters into operative connection with the control lever for actuating the longitudinal adjustment means, when the control lever is in the active position, but does not enter into operative connective with the control lever, when the control lever is in the passive position.

In a vehicle seat with an easy-entry function, as it is known for example from WO 2012/022 767 A1, different actuating elements are provided for shifting the vehicle seat on the one hand in connection with the easy-entry function and on the other hand for adjusting the backrest inclination. A first actuating element here realizes an easy-entry actuating unit, upon actuation of which the backrest part can be folded forwards while at the same time shifting the vehicle seat forwards to provide an access to a rear seat located behind the vehicle seat. A second actuating element, on the other hand, serves for actuating the fitting, in order to provide for adjusting the backrest inclination for a comfortable seating position of a seat occupant. These different actuating elements in principle allow an independent actuation of the at least one fitting.

With such an arrangement care should be taken, however, that upon actuation of the at least one fitting for example via the first actuating element in connection with the easy-entry function an actuation at the second actuating element cannot occur at the same time, in order to avoid a malfunction during the actuation. An actuation of the second actuating element while at the same time actuating the first actuating element providing an easy-entry function can lead to a maloperation in particular in the presence of a control unit via which a coupling with a longitudinal adjustment means can be activated or deactivated, which must be avoided.

SUMMARY

It is an object of the present invention to provide a vehicle seat in which the risk of a maloperation of a fitting by different actuating elements is avoided as far as possible.

According to the invention, the coupling element and the fitting lever are coupled with each other via a first connecting means, which includes a first coulisse (or slot) and a first engaging element engaging into the first slot, and a second connecting means which includes a second slot and a second engaging element engaging into the second slot, such that upon actuation of the at least one fitting by the first actuating element an actuation of the at least one fitting by the second actuating element is blocked.

The present invention proceeds from the idea to accomplish the connection of the coupling element, via which the second actuating element is coupled with the at least one fitting, and the fitting lever which is engaged by the coupling element for actuating the at least one fitting, via two connecting means which each include a slot guideway.

For example, the slots of the two connecting means can be arranged on the coupling element, while the engaging elements, for example pins engaging into the slots, are arranged on the fitting lever, wherein this arrangement in principle also can be kinematically reversed. The slots also can be arranged on the fitting lever and the engaging elements can be arranged on the coupling element, wherein it is also conceivable to provide one slot at the fitting lever and one slot at the coupling element, into which an engaging element of the coupling element or an engaging element of the fitting lever engages.

On actuation of the at least one fitting via the first actuating element, the engaging elements are shifted as a result of the fitting lever being pivoted in the associated slots. By a suitable shape of the slots, the position of the coupling element relative to the fitting lever thereby is blocked, which leads to the fact that the second actuating element coupled with the coupling element also is blocked and thus, on actuation of the first actuating element, cannot be actuated.

Due to the fact that on actuation of the first actuating lever, for example to provide an easy-entry function, the second actuating element cannot be actuated, for example to adjust the backrest inclination, a maloperation is excluded. On actuation of the first actuating element the second actuating element is blocked, so that a user cannot actuate the at least one fitting via the second actuating element.

The first slot of the first connecting means for example can be extended linearly and thus provide for linearly shifting the associated first engaging element. The second slot on the other hand preferably includes a first portion and a second portion different from the first portion. These portions advantageously extend at an angle to each other, in that they for example describe an angle of approximately 90° to each other. On actuation of the first actuating element, the second engaging element associated to the second slot is shifted into the first portion. On actuation of the second actuating element, on the other hand, the second engaging element moves into the second portion. When the directions of extension of the first portion of the second slot and of the first slot differ from each other and thus the guideways for the engaging elements in the slots as specified by the directions of extension are different, the position of the coupling element relative to the fitting lever is fixed when the fitting lever is deflected as a result of the actuation of the first actuating element, so that upon actuation of the first actuating element the coupling element is blocked relative to the fitting lever and thus an actuation of the second actuating element is not possible. When the directions of extension of the second portion of the second slot and of the first slot also are different, resetting of the second actuating element after actuation of the second actuating element for example is prevented, when the at least one fitting is kept in its unlocked position via a suitable free-pivoting mechanism.

Such free-pivoting mechanism serves to prevent locking of the at least one fitting when the backrest part is pivoted about the pivot axis relative to the seat part in a predetermined angular range on the adjustment path. In this way, free pivoting of the backrest part becomes possible in order to for example fold the backrest part forwards into a so-called cargo position in which the backrest part extends flat and thus provides a shelf or is recessed flatly into a floor, for example in the rear space of a vehicle.

Due to the fact that on actuation of the second actuating element the second engaging element associated to the second slot is retracted into the second portion of the second coulisse and this second portion is oriented differently as compared to the first slot, the position of the coupling element relative to the fitting lever is fixed and thus the second actuating element also is fixed in its position, so that the second actuating element cannot be reset inadvertently, when the at least one fitting and hence also the fitting lever are held in position via a free-pivoting mechanism.

The second actuating element for example is formed as lever pivotally mounted on the seat part and preferably is flexibly connected with the coupling element. Thus, the coupling element is flexibly coupled on the one hand with the second actuating element and on the other hand with the fitting lever via the two connecting means, so that via the coupling element a coupling is made between the second actuating element and the fitting lever. On actuation of the second actuating element, adjustment forces are introduced into the fitting lever via the coupling element and thereby into the fitting, in order to move the fitting from its locked position into its unlocked position.

The fitting lever preferably is firmly connected with an actuating shaft, which in turn is connected with the at least one fitting. When in a vehicle seat for example two fittings are provided on both sides of the vehicle seat, the actuating shaft extends between these two fittings and serves for the synchronous actuation of the two fittings. By pivoting the fitting lever, the actuating shaft also is pivoted and thereby a suitable control element of the fittings is moved, which for example for unlocking the fittings acts on locking bolts and brings the same out of engagement with an associated toothing, as is described in DE 10 2008 047 660 A1, whose contents will be included herein by reference.

The vehicle seat advantageously additional includes a longitudinal adjustment means for longitudinally adjusting the vehicle seat relative to a vehicle floor. In connection with an easy-entry function, the at least one fitting can be unlocked in this case and at the same time the longitudinal adjustment means can be actuated for sliding the vehicle seat forwards, so as to create an entry into a space behind the vehicle seat and thus for example provide an access to a rear seat arranged behind the vehicle seat.

In a concrete aspect, an activation element can be provided, which is coupled with the coupling element via a third connecting means which includes a third slot and a third engaging element engaging into the third slot. The activation element serves for shifting a control lever arranged on the seat part and operatively connected with the longitudinal adjustment means between an active position and a passive position. In the active position, on pivoting of the backrest part the control lever can be brought into an operative connection with a driving stop arranged on the backrest part, in order to actuate the adjusting means. On pivoting of the backrest part, the driving stop thus strikes against the control lever and entrains the same, so that the longitudinal adjustment means thereby is actuated, in order to provide for sliding the vehicle seat forwards in connection with the easy-entry function. In the passive position, on the other hand, the control lever is shifted such that on pivoting of the backrest part it does not cooperate with the driving stop arranged on the backrest part. The easy-entry function thus is deactivated. In particular, on pivoting of the backrest part, the longitudinal adjustment means is not activated as well.

The activation element preferably is formed as lever and pivotally arranged on the seat part.

In a concrete aspect, the activation element is in the active position when the second actuating element is not actuated, and on actuation of the second actuating element is transferred into its passive position. In a normal position, the activation element thus is in its active position, so that on actuation of the first actuating element in connection with an easy-entry function and on pivoting of the backrest part, the control lever is entrained by the driving stop at the backrest part, and the longitudinal adjustment means thereby is actuated for sliding the vehicle seat forwards. On the other hand, when the second actuating element is actuated for adjusting the backrest inclination independent of an easy-entry function, the activation element is shifted and transferred into its passive position, so that the easy-entry function is deactivated.

In this respect it should be noted that in its starting position the activation element also can be in the passive position. In this case, the activation element is transferred into the active position on actuation of the first actuating element in connection with an easy-entry function, so as to provide for an actuation of the longitudinal adjustment means for providing the easy entry function. On the other hand, when the second actuating element is shifted, the activation element remains in its passive position.

The coupling of the activation element with the coupling element can be provided via a third connecting means. The third connecting means comprises a third slot and a third engaging element engaging into the third slot, wherein the third slot for example is arranged on the coupling element and the third engaging element is arranged on the activating lever. When the activation element is in its active position with non-actuated second actuating element, the third engaging element substantially is not shifted in the third slot when the first actuating element is shifted. When the second actuating element is actuated, however, the engaging element for example can move from a first portion of the third slot into a second portion of the third slot, so that as a result of coupling of the coupling element with the activation element, the activation element is shifted from the active position into the passive position.

In an advantageous aspect, the activation element is elastically biased with respect to the coupling element by a spring. The elastic bias for example acts in direction of the active position of the activation element, so that after shifting of the activation element the activation element automatically is reset into its active position.

For shifting the control lever into the passe position the activation element preferably is actuated by the third connecting means of the coupling element. With its slot, the coupling element thus for example acts on the activation element and shifts the same, whereby the control lever is moved and transferred into the passive position. Resetting into the active position, however, is effected by action of the biasing spring. The connecting means releases the activation element, so that the same can pivot back into its active position due to the spring bias.

For coupling with the control lever, the activation element for example can be operatively connected with a cam pivotable about a pivot axis, wherein on pivoting for shifting the control lever between its active position and its passive position the cam acts on the control lever and thereby moves the same.

Actuating the second actuating element outside the easy-entry function provides for folding the backrest part forwards into a cargo position, in which the backrest part is pivoted into a position folded forwards towards the seat part, so as to for example create a largely flat storage surface. In this cargo position, the control lever is in the passive position and is blocked by a blocking surface of the driving stop such that it cannot be brought into its active position. When on actuation of the second actuating element the control lever is in the passive position, the driving stop with a stop surface arranged thereon can be moved past the control lever, so that the control lever is not entrained for actuating the longitudinal adjustment means. To prevent however after folding the backrest part forwards into the cargo position that the control lever can stand up into its active position, when the second actuating element is released, the blocking surface is provided on the driving stop, which is arranged in the pivot path of the control lever such that standing up of the control lever is blocked. Due to the fact that the control lever cannot be shifted into its active position, the activation element also is retained and an activation of the easy-entry function is prevented in the cargo position. When the backrest then is put up again from the cargo position, the blocking surface again releases the control lever, so that the same again stands up into the active position, for example driven by an elastic bias between the coupling element and the activation element.

BRIEF DESCRIPTION OF THE DRAWINGS

The idea underlying the invention will be explained in detail below with reference to the exemplary embodiments illustrated in the Figures.

FIG. 1 shows a perspective view of a vehicle seat with a seat part and a backrest part pivotally coupled with the seat part via two fittings, which in connection with an easy-entry function can be pivoted forwards in combination with sliding the vehicle seat forwards.

FIGS. 2A, 2B show views of a fitting of the vehicle seat during normal pivoting of the backrest part.

FIG. 4 shows a view of a (second) actuating element, which via a coupling element is coupled with a fitting lever of a fitting, in a closed position of the fitting.

DETAILED DESCRIPTION

Figure 3A:
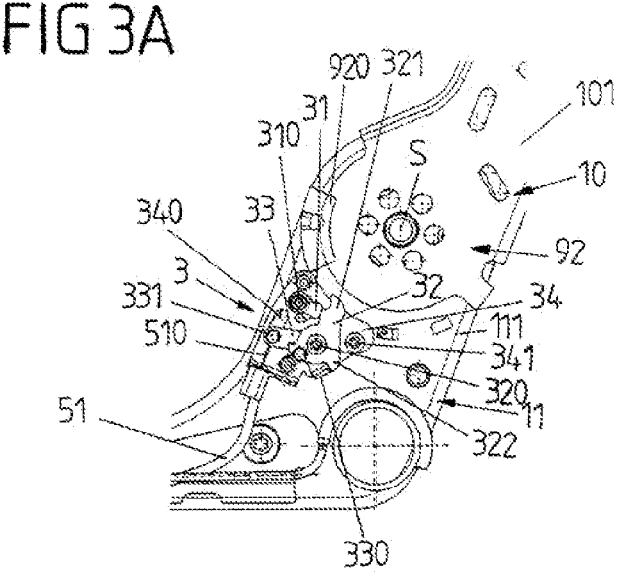
FIGS. 3A-3C show views of the fitting during forward-pivoting of the backrest part in connection with the easy-entry function.

FIG. 1 shows a perspective overview of a vehicle seat 1 which is formed as rear seat for example in the second row in a vehicle with three seat rows and includes a backrest part 10, which via two fittings 91, 92 formed as detent fittings is pivotally connected with a seat part 11.

The fittings 91, 92 formed for example as described in DE 10 2008 047 660 A1 are connected with each other via an actuating shaft 93 extending along a pivot axis S of the backrest part 10, wherein by rotating the actuating shaft 93 the fittings 91, 92 can be actuated, in order to pivot the backrest part 10 relative to the seat part 11.

Via a longitudinal guideway 8, which comprises two bottom rails 81, 82 to be arranged on a vehicle floor and upper rails 83, 84 longitudinally shiftably mounted on the bottom rails 81, 82, the seat part 11 is shiftably connectable with a vehicle floor in longitudinal direction of a vehicle and includes a longitudinal adjustment means 5 only indicated in FIG. 1, via which the upper rails 83, 84 can be latched with the bottom rails 81, 82 for locking the vehicle seat 1 in a longitudinal position, and which for longitudinally shifting the vehicle seat 1 can be actuated via an actuating lever 7 arranged at the front of the seat part 11 and is formed for example as described in WO 2012/022767 A1, whose contents will fully be included herein by reference.

In a manner known per se, the fittings 91, 92 each include a fitting part firmly mounted on the seat part and connected with frame parts 110, 111 of the seat part 11 and a fitting part firmly mounted on the backrest and connected with frame parts 100, 101 of the backrest part 10, which for pivoting the backrest part 10 can be pivoted to each other.

In the case of such a vehicle seat 1, to provide for an access to a space located behind the vehicle seat 1, for example to a further bench of the vehicle arranged behind the vehicle seat 1, the vehicle seat 1 has a so-called easy-entry function according to which the backrest part 10 can be brought into a forward-pivoted position, and with forward-pivoted backrest 10 the vehicle seat 1 can be brought into a position shifted forwards. To provide this easy-entry function, the vehicle seat 1 includes a first actuating element in the form of an easy-entry actuating unit 2 arranged at an upper end of the backrest part 10, a control unit 3 arranged in the vicinity of the fitting 92, a backrest locking unit 4 cooperating with the control unit 3, and a so-called memory unit 6 which cooperates with the longitudinal adjustment means 5 for latching the vehicle seat 1 in a front comfort position, when the vehicle seat 1 is reset from an easy-entry position.

A characteristic feature of the vehicle seat 1 shown in FIG. 1 consists in that the individual units, which to provide the easy-entry function are arranged on the vehicle seat 1, are formed in a modular fashion and are coupled with each other via Bowden cables 51, 43. The units are designed such that they can be retrofitted in an existing vehicle seat 1 or can easily be integrated into an existing vehicle seat concept, without the construction and mode of operation of the vehicle seat 1 otherwise changing significantly.

A possible mode of operation of the individual units 2, 3, 4, 5, 6 is explained in detail in WO 2012/022767 A1, wherein it should be noted that the individual units 2, 3, 4, 5, 6 need not necessarily be present in combination, but for example the backrest locking unit 4 or the memory unit 6 also can be used in a completely different type of easy-entry system independent of a control unit 3 as described above.

In addition, it is not absolutely necessary that all units are present in a vehicle seat 1. It is also conceivable, for example, to omit the backrest locking unit 4 and/or the memory unit 6, in order to create an inexpensive vehicle seat 1 with a simple easy-entry function. The vehicle seat 1 with the described easy-entry function and in particular the control unit 3 provides for combining individual units 2, 3, 4, 5, 6 with each other in a modular way and possibly also omit the same.

First of all, the mode of operation of the control unit 3 will be described with reference to FIGS. 2A-2B and 3A-3C.

The control unit 3 includes a control lever 32 which is pivotally arranged on a retaining plate 34 about a pivot axis 320 and via the retaining plate 34 is arranged on the frame part 111 of the seat part 11. On the retaining plate 34 a cam 31, for example made of plastics, is pivotally arranged about a pivot axis 310, and an actuating lever 33 is pivotally arranged about the pivot axis 320. The cam 31 serves for actuating the control lever 32 for shifting the control lever 32 between a passive position shown in FIGS. 2A and 2B, in which it cannot interact with a backrest-mounted stop 920 of the backrest part 10, and an active position, shown in FIGS. 3A to 3C, in which it can interact with the stop 920.

At one end, the actuating lever 33 is connected with a pulling means 510 of the Bowden cable 51 via a coupling point 331 for connecting the control unit 3 with the longitudinal adjustment means 5, and at its other end includes a stop 330 for interacting with a stop 322 at the control lever 32. At its end carrying the coupling point 331, the actuating lever 33 is guided in a coulisse (or slot) 340 at the retaining plate 34.

The control unit 3 serves for actuating the longitudinal adjusting means 5 in connection with the easy-entry function of the vehicle seat 1. The control unit 3 actuates the longitudinal adjusting means 5, in order to move the vehicle seat 1 forwards in connection with the easy-entry function in dependence on the pivoting movement of the backrest part 10.

The mode of operation of the control unit 3 is as follows.

FIGS. 2A, 2B first of all show the pivoting of the backrest part 10 during a normal adjusting operation outside the easy-entry function. During such normal pivoting, i.e. during a normal use of the backrest part 10, the control lever 32 is in the passive position such that the control lever 32 with a hook 321 arranged thereon cannot interact with the stop 920 of the backrest part 10. When the backrest part is pivoted by actuating the fittings 91, 92 (see FIG. 1), this is effected without the control lever 32 being pressed upon and thus without the longitudinal adjustment means 5 being actuated. In this way, the inclination of the backrest part 10 can be adjusted and the backrest part 10 for example can also be brought into a so-called cargo position, i.e. into a horizontal or almost horizontal position in which the stowage space of a loading space is maximized.

Figure 3B:
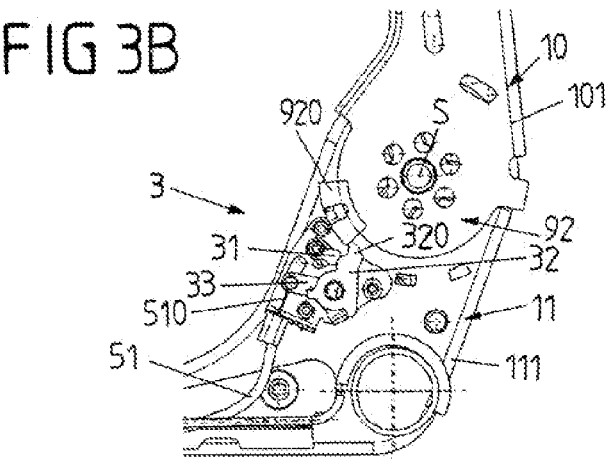
Figure 3C:
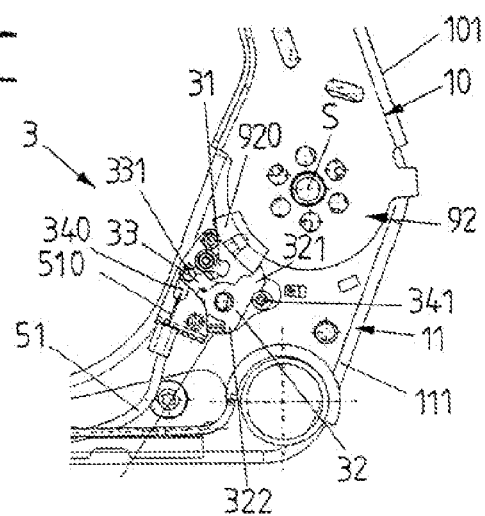

In connection with the easy-entry function, shown in FIGS. 3A to 3C, the control lever 32 is pivoted about its pivot axis 320 via the cam 31 and brought into the active position shown in FIG. 3A. When the easy-entry actuating unit 2, which is coupled with the fittings 91, 92, is actuated and the fittings 91, 92 thereby are unlocked, the backrest part 10, as shown in FIG. 3B, can be pivoted forwards about the pivot axis S, so that the backrest-mounted stop 920 rotates about the pivot axis S and approaches the hook 321 of the control lever 32. After pivoting the backrest part 10 about a predetermined pivot path, the stop 920 gets in contact with the hook 321 and, as shown in FIG. 3C, entrains the same, until the control lever 32 gets in contact with an end stop 341 provided at the retaining plate 34 and thus cannot be pivoted further, so that via the control lever 32 and the backrest-mounted driving stop 920, the backrest part 10 is prevented from pivoting further.

In the active position, shown in FIG. 3A, the control lever 32 with its hook 321 is located in the pivot path of the driving stop 920 and at the same time has its stop 322 in contact with the stop 330 of the actuating lever 33. When the control lever 32, as shown in FIGS. 3B and 3C, is entrained by pivoting the backrest part 10, the actuating lever 33 also is entrained at the same time by the contact of the stop 320 of the control lever 32 with the stop 330 of the actuating lever 33 and pivoted about the pivot axis 320, whereby the Bowden cable 51 with its pulling means 510, which is coupled with the actuating lever 33 via the coupling point 331, is actuated for unlocking the longitudinal adjustment means 5.

The control unit 3 hence serves for actuating the longitudinal adjustment means 5 in dependence on the pivoting movement of the backrest part 10 in connection with the easy-entry function. Due to the fact that the actuation of the longitudinal adjustment means 5 is effected via the control unit 3, a direct connection of the easy-entry actuating unit 2 with the longitudinal adjustment means 5 is not required. The actuation of the longitudinal adjustment means 5 exclusively is effected via the control unit 3.

In connection with the easy-entry function, the control lever 32 of the control unit 2 is in the active position shown in FIG. 3A, wherein two possibilities exist for actuating the control lever 32.

On the one hand, the easy-entry actuating unit 2 can be connected with the fittings 91, 92 and in addition also with the cam 31, so that upon actuation of the easy-entry actuating unit 2 the fittings 91, 92 are unlocked on the one hand, and on the other hand the control lever 32 is put up into its active position as shown in FIG. 3A via the cam 31. In a normal condition, the control lever 32 in this case is in the passive position as shown in FIG. 2A (wherein it preferably is biased into this passive position by a suitable spring element) and will be transferred into its active position as shown in FIG. 3A only upon actuation of the easy-entry actuating unit 2.

On the other hand, it is also possible to hold the control lever 32 in the active position as shown in FIG. 3A, when it is in a normal condition, so that in connection with the easy-entry function an actuation of the control lever 32 is not required. In this case, the easy-entry actuating unit 2 only is coupled with the fittings 91, 92, but not with the control unit 3.

To provide a normal pivoting of the backrest part 10 in this second variant outside the easy-entry function, a second actuating element 94 (see FIG. 4) different from the easy-entry actuating unit 2 is to be coupled with the control unit 3 and in particular with the control lever 32 such that upon actuation of this other, second actuating element 94 the control lever 32 is brought into its passive position as shown in FIGS. 2A and 2B for the normal pivoting of the backrest part 10.

FIGS. 4 to 6A-6C show an exemplary embodiment of a second actuating element 94, which serves for adjusting the backrest inclination outside the easy-entry function.

The second actuating element 94 (also referred to as comfort lever) is pivotally arranged about a pivot axis 940 on a lateral frame part 111 of the seat part 11 and can be actuated by a user for adjusting the backrest inclination of the backrest part 10. The second actuating element 94 is flexibly coupled with a coupling element 95 at an articulation point 941, which coupling element is connected with a fitting lever 96 at its end facing away from the second actuating element 94. The fitting lever 96 is firmly arranged on the actuating shaft 93 such that by pivoting the fitting lever 96 the fittings 91, 92 can be actuated.

The coupling of the coupling element 95 with the fitting lever 96 is effected via two connecting means which each include an engaging element 960, 961 in the form of a pin, which is arranged on the fitting lever 96, and a slot 952, 953 arranged on the coupling element 95, into which the associated engaging element 960, 961 engages. The slot 953 of the first connecting means is extended linearly and thus provides a linear guideway for the engaging pin 960. The slot 952 of the second connecting means, on the other hand, includes two portions 952A, 952B extending at right angles to each other, wherein in dependence on the actuation of the fittings 91, 92 via the first actuating element in the form of the easy-entry actuating unit 2 or the second actuating element 94 the pin 961 associated to these slots 952 moves into different portions 952A, 952B of the slot 952, as will yet be described below.

Furthermore, an activation element 35 in the form of a lever pivotally mounted about a pivot axis 250 is arranged on the frame part 111. The activation element 35 is coupled with the control lever 32 (or the cam 31 for shifting the control lever 32), so that on shifting of the activation element 35 the control lever 32 is moved for shifting between the active position and the passive position.

The activation element 35 is coupled with the coupling element 95 via a third connecting means. The third connecting means comprises a third slot 951, into which a third engaging element 351 engages in the form of a pin arranged on the activation element 35. The third slot 951 includes two different portions 951A, 951B, wherein in dependence on the actuation of the detent fittings 91, 92 the engaging element 351 is arranged in different portions 951A, 951B of the slot 951, as will yet be described below.

Via a spring 353 extending between a lever arm 352 of the activation element 35 and a hook 950 of the coupling element 95 the activation element 35 is biased with respect to the coupling element 95. The bias on the one hand effects that the activation element 35 is held in the position shown in FIG. 4, when it is not actuated by the coupling element 95. On the other hand, the bias also effects that the coupling element 95 is biased in direction of the activation element 35 and thus upwards in the drawing plane according to FIG. 4, and hence the clearance between the coupling element 95 and the activation element 35 is removed.

FIG. 4 shows the arrangement in a position in which the fittings 91, 92 are locked and the backrest part 10 is arrested relative to the seat part 11. From this locked position, the fittings 91, 92 can be actuated by the first actuating element in the form of the easy-entry actuating unit 2 or by the second actuating element 94 and thus be unlocked, in order to pivot the backrest part 10 relative to the seat part 11. By actuating the first actuating element in the form of the easy-entry actuating unit 2, an easy-entry function can be provided, as explained above, by which the backrest part 10 can be pivoted forwards and at the same time the vehicle seat 1 as a whole can be shifted to the front. By actuating the second actuating element 94, on the other hand, the inclination of the backrest part 10 can be adjusted for adjusting a comfort position for a seat occupant, or the backrest part 10 can be transferred into a cargo position.

Figure 5A:
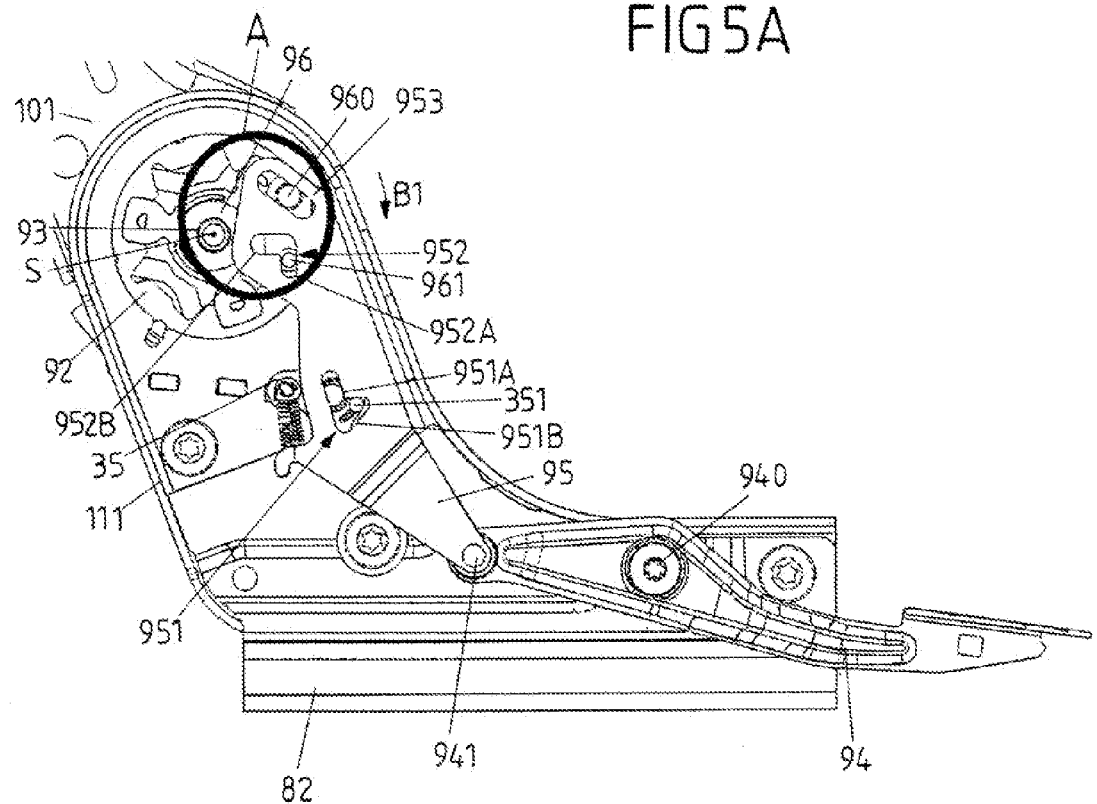
FIG. 5A shows a view of the arrangement of FIG. 4, on actuation of the fitting via a (first) actuating element in connection with an easy-entry function.
Figure 5B:
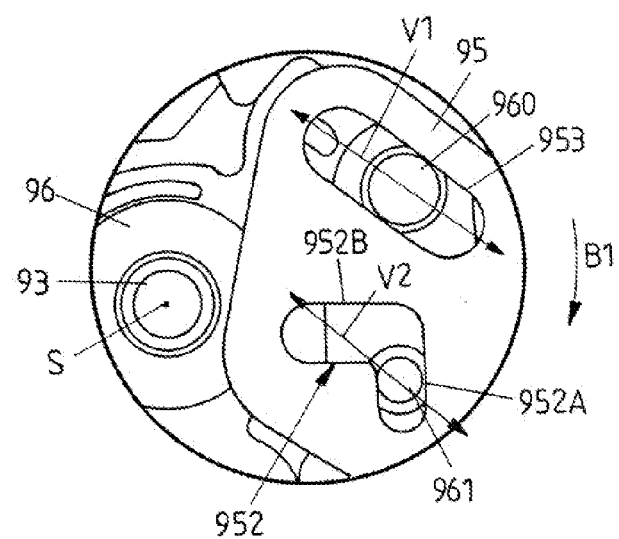
FIG. 5B shows an enlarged view of the detail A according to FIG. 5A.

FIGS. 5A and 5B illustrate the shifting of the fittings 91, 92 by actuating the easy-entry actuating unit 2. By actuating the easy-entry actuating unit 102, which for example engages the actuating shaft 93 in a suitable way, the fittings 91, 92 are unlocked, in that the actuating shaft 93 and hence also the fitting lever 96 arranged on the actuating shaft 93 is pivoted in a direction of movement B1. The fitting lever 96, as shown in FIGS. 5A and 5B, correspondingly changes its position relative to the coupling element 95, wherein the engaging elements 960, 961 are shifted in the associated slots 952, 953 and get into the position inside the slots 952, 953 as shown in FIGS. 5A and 5B.

As can be taken in particular from the enlarged view of FIG. 5B, the engaging element 960 is shifted in longitudinal direction in the first slot 953 and gets into an approximately central position in the slot 953. The second engaging element 961, on the other hand, moves into the first portion 952A of the associated, second slot 952 and thus gets into the position shown in FIG. 5B.

In this position, an actuation by the second actuating element 94 is blocked. When the fitting lever 96 is retained, the first engaging element 960 can move in the associated slot merely along the shifting direction V1, which is not possible for the second engaging element 961 in the associated second slot 952. For the second engaging element 961 a movement along a shifting direction V2 parallel to the shifting direction V1 is blocked. The second engaging element 961 can move merely vertically in the associated portion 952A of the second slot 952.

Because the position of the coupling element 95 relative to the fitting lever 96 thus is fixed, when the fitting lever 96 is retained, a movement of the second actuating element 94 is blocked. Upon actuation of the easy-entry actuating unit 2, the fitting lever 96 is deflected and held in position. During pivoting of the backrest part 10 a free-pivoting mechanism also can act in a free-pivoting range, which prevents locking of the fittings 91, 92 in that it holds the fittings 91, 92 in their unlocked position and thereby also retains the fitting lever 96 in the position shown in FIGS. 5A and 5B.

Due to the shape of the slots 952, 953 a simultaneous actuation of the second actuating element 94 thus is blocked on actuation of the easy-entry unit 2. Because the coupling element 95 is retained in its position relative to the fitting lever 96 due to the position of the pin-shaped engaging elements 960, 961, the actuating element 94 flexibly coupled with the coupling element 95 cannot be shifted either and thus is held in the position shown in FIG. 5A.

When the fittings 91, 92 are actuated by the first actuating element in the form of the easy-entry actuating unit 2, the coupling element 95 is shifted only slightly by pivoting the fitting lever 96. This slight movement of the coupling element does not lead to the activation element 35 being shifted, so that the same remains in its taken position, corresponding to the active position of the control lever 32, and the control lever 32 thus is not put out of its active position. During forward-pivoting of the backrest part 10, the control lever 32 thus is entrained via the driving stop 920, as has been explained above, and the longitudinal adjustment means 5 is actuated for sliding the vehicle seat 1 forwards in connection with the easy-entry function.

Figure 6A:
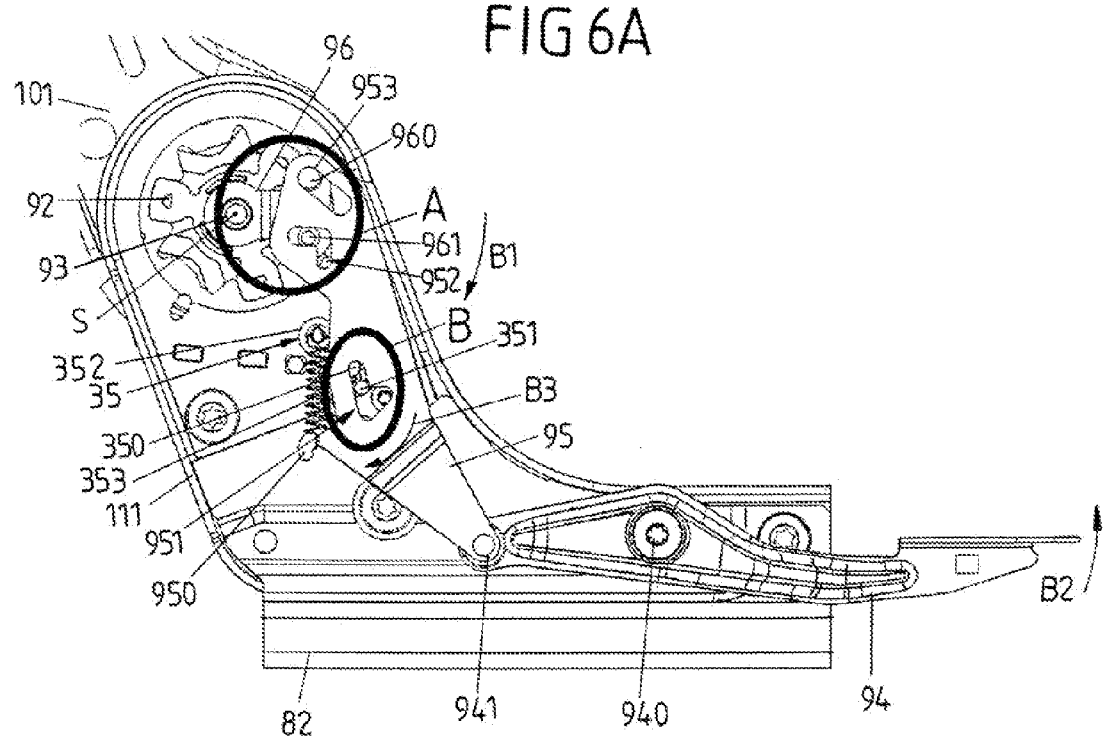
FIG. 6A shows a view of the arrangement of FIG. 4, on actuation of the (second) actuating element for adjusting the backrest inclination.
Figure 6B:
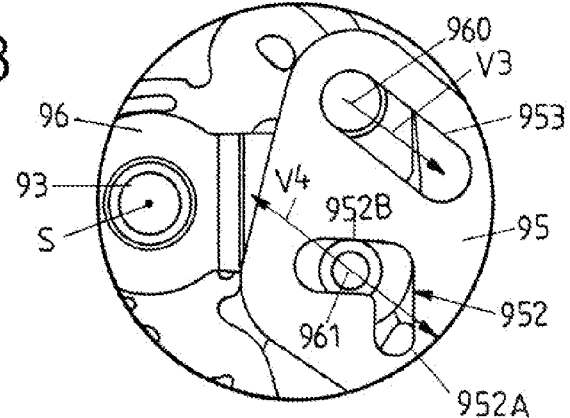
FIG. 6B shows an enlarged view of the detail A according to FIG. 6A.
Figure 6C:
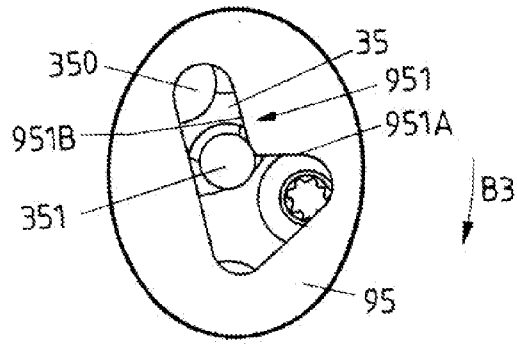
FIG. 6C shows an enlarged view of the detail B according to FIG. 6A.

Upon actuation of the second actuating element 94, as shown in FIGS. 6A-6C, the coupling element 95 however is shifted by the second actuating element 94. By moving the actuating element 94 in a direction of movement B2 (see FIG. 6A), the coupling element 95 is pulled downwards and by acting on the pin-shaped first engaging element 960 in the slot 953 the fitting lever 96 thereby is shifted for unlocking the fittings 91, 92. When the fittings 91, 92 are unlocked, the backrest part 10 then can be shifted in its inclined position.

When the coupling element 95 is shifted in the direction of movement B2 by actuating the second actuating element 94, the fitting lever 96 is pivoted in the direction of movement B1, wherein the first engaging element 960 remains in its end position in the slot 953, as is shown in FIG. 6A. When the fitting lever 96 is pivoted, the second engaging element 961 moves into the second portion 952B of the second slot 952 of the coupling element 95, as is shown in FIG. 6B.

When the second actuating element 94 has been actuated and the pin-shaped engaging elements 960, 961 have reached the position in the associated slots 952, 953 as shown in FIG. 6B, the coupling element 95 is arrested in its position relative to the fitting lever 96, when during pivoting of the backrest part 10 for transferring the vehicle seat 1 for example into a cargo position the backrest part 10 is folded forwards through a free-pivoting range. In this free-pivoting range, a suitable free-pivoting mechanism holds the fittings 91, 92 in their unlocked position, so that the fitting lever 96 also is held in its position. As a result, the coupling element 95 neither can be moved relative to the fitting lever 96, because the engaging elements 960, 961 cannot be moved in parallel in the associated slots 952, 953, because the first engaging element 960 in the first associated slot 953 can be shifted merely in the direction of movement V3, but the second engaging element 961 in the associated second slot 952 cannot be moved in the parallel direction of movement V4, but merely along the second portion 952B of the associated second slot 952.

When the fitting lever 96 is retained, resetting of the second actuating element 94 thus is prevented, so that the second actuating element 94 is blocked in its position. The actuating element 94 only can be reset again, when the fittings 91, 92 can lock again after passing through the free-pivoting range.

When the second actuating element 94 is actuated, the coupling element 95 also acts on the pin-shaped engaging element 351 of the activation element 35 via its first portion 951A and pivots the activation element 35 about its pivot axis 350 into the pivoted position shown in FIGS. 6A and 6B. The pin-shaped engaging element 351 of the activation element 35 then moves into the second portion 951B of the associated slot 951 of the coupling element 95 and gets into the position shown in FIG. 6C. In this position, the pin-shaped engaging element 351 rests against the right edge of the slot portion 951B as shown in FIG. 6C, via which the coupling element 95 acts on the activation element 35 and thus holds the same in position.

Due to shifting of the activation element 35, the control lever 32 is shifted into its passive position according to FIGS. 2A and 2B, so that during pivoting of the backrest part 10 the driving stop 920 cannot cooperate with the control lever 32 and correspondingly an actuation of the longitudinal adjustment means 5 does not occur. The easy-entry function thus is deactivated, when the actuating element 94 is actuated. Via the actuating element 94, the inclination of the backrest part 10 can be adjusted exclusively, wherein the backrest part 10 for example also can be folded forwards into a cargo position, in order to create a flat storage surface.

When shifting the activation element by actuating the second actuating element 94, the spring 353 mounted between the lever arm 352 of the activation element 35 and the hook 950 of the coupling 95 is tensioned, as can be taken from a synopsis of FIG. 4 and FIG. 6A. When the fittings 91, 92 lock again, the activation element 35 also is reset automatically due to the spring bias and again gets into the starting position according to FIG. 4, which shows the arrangement with closed fittings 91, 92 and non-actuated actuating elements 2, 94.

When the second actuating element 94 is actuated outside the easy-entry function, the backrest part 10 can be folded forwards into a cargo position, in which the backrest part 10 is pivoted into a position folded forwards towards the seat part 11, so as to for example create a largely flat storage surface. In this cargo position, the control lever 32 is in the passive position according to FIG. 2B and is blocked by a blocking surface 921 of the driving stop 920 such that it cannot be brought into its active position. In this way, it is prevented that after reaching the cargo position and after releasing the second actuating element 94, the control lever 32 can stand up into the active position. Due to the fact that the control lever 32 is blocked in its passive position, the activation element 35 also is retained in the position shown in FIG. 6A and thus cannot be reset after reaching the cargo position.

When the backrest part 10 is put up again from the cargo position, the blocking surface 921 of the driving stop 920 also releases the control lever 32. The same thus stands up into its active position, driven by the spring 353 acting between the coupling element 95 and the activation element 35, which spring moves the activation element 35, thereby shifts the cam 31 and via the cam 31 acts on the control lever 32 for putting up the control lever 32.

Driven by the spring 353 an automatic reset of the control lever 32 into the active position is effected after standing up, without the coupling element 95 drivingly acting on the activation element 35. When the second actuating element 94 is actuated, the coupling element 95 thus serves for shifting the activation element 35 and thereby also the control lever 32, wherein resetting is effected automatically driven by the spring 353.

The idea underlying the invention is not limited to the exemplary embodiments described above, but can also be realized in completely different embodiments.

In particular, coupling of the first actuating element with the longitudinal adjustment means in principle also can be effected other than via the described control lever, so that an activation element possibly also can be omitted.

A vehicle seat as described here can be realized as front seat or also as rear seat in a vehicle.

LIST OF REFERENCE NUMERALS

1 vehicle seat
10 backrest part
100, 101 frame part
11 seat part
110, 111 frame part
2 easy-entry actuating unit
3 control unit
31 cam
310 pivot axis
32 control lever
320 pivot axis
321 hook
322 stop
33 actuating lever
330 stop
331 coupling point
34 retaining plate
340 slot
341 end stop
35 activation element
350 pivot axis
351 pin
352 lever arm
353 spring
4 backrest locking unit
5 longitudinal adjustment means
51 Bowden cable
510 pulling means
6 memory unit
7 actuating lever
8 longitudinal guideway
81, 82 lower rail
83, 84 upper rail
9 inclination adjusting means
91, 92 detent fitting
920 driving stop
921 blocking surface
93 actuating shaft
94 actuating element
940 pivot axis
941 articulation point
95 coupling element
950 hook
951 slot
951A, 951B portion
952 slot
952A, 952B portion
953 slot
96 fitting lever
960, 961 engaging element (pin)
B1, B2, B3 movement
H direction to the rear
S pivot axis
V direction to the front
V1-V4 adjusting movement

The invention claimed is:

1. A vehicle seat, comprising
a seat part,
a backrest part,
a least one fitting which connects the backrest part with the seat part pivotally about a pivot axis and in a locked condition is formed to hold the backrest part in position to the seat part, and in an unlocked condition is formed to permit pivoting of the backrest part relative to the seat part,
a first actuating element for actuating the at least one fitting,
a second actuating element different from the first actuating element for actuating the at least one fitting,
a fitting lever connected with the at least one fitting, and
a coupling element via which the second actuating element is coupled with the fitting lever, wherein by shifting the second actuating element the fitting lever is movable for actuating the at least one fitting, wherein
the coupling element and the fitting lever are coupled with each other via a first connecting means, which includes a first slot and a first engaging element engaging into the first slot, and a second connecting means which includes a second slot and a second engaging element engaging into the second slot, such that upon actuation of the at least one fitting by the first actuating element an actuation of the at least one fitting by the second actuating element is blocked.

2. The vehicle seat according to claim 1, wherein the first slot and the second slot are arranged on the coupling element and the first engaging element and the second engaging element are arranged on the fitting lever.

3. The vehicle seat according to claim 1, wherein the first engaging element and the second engaging element each are formed as pin engaging into the associated slot.

4. The vehicle seat according to claim 1, wherein the second slot includes a first portion and a second portion different from the first portion, wherein the second engaging element upon actuation of the first actuating element moves into the first portion and upon actuation of the second actuating element moves into the second portion.

5. The vehicle seat according to claim 4, wherein the portions extend at an angle to each other.

6. The vehicle seat according to claim 1, wherein the second actuating element is pivotally mounted on the seat part and flexibly connected with the coupling element.

7. The vehicle seat according to claim 1, wherein the at least one fitting includes a free-pivoting mechanism which is formed to prevent locking of the at least one fitting when the backrest part is pivoted about the pivot axis relative to the seat part in a predetermined angular range.

8. The vehicle seat according to claim 1, wherein the fitting lever is arranged on an actuating shaft connected with the at least one fitting.

9. The vehicle seat according to claim 1, wherein the vehicle seat includes a longitudinal adjustment means for longitudinally adjusting the vehicle seat.

10. The vehicle seat according to claim 9, further-comprising an activation element which is coupled with the coupling element via a third connecting means which includes a third slot and a third engaging element engaging into the third slot, wherein for shifting a control lever, which is arranged on the seat part and is operatively connected with the longitudinal adjustment means, the activation element is shiftable between an active position, in which during pivoting of the backrest part the control lever can be brought into an operative connection with a driving stop arranged on the backrest part for actuating the longitudinal adjustment means, and a passive position, in which on pivoting of the backrest part the control lever cannot be brought into an operative connection with the driving stop arranged on the backrest part for actuating the longitudinal adjustment means.

11. The vehicle seat according to claim 10, wherein the activation element is pivotally arranged on the seat part.

12. The vehicle seat according to claim 10, wherein with non-actuated second actuating element the activation element is in the active position and upon actuation of the second actuating element is transferred into the passive position.

13. The vehicle seat according to claim 10, wherein the third slot is arranged on the coupling element and the third engaging element is arranged on the activation lever.

14. The vehicle seat according to claim 10, wherein the third slot includes a first portion and a second portion different from the first portion, wherein with non-actuated second actuating element the third engaging element is arranged in the first portion and upon actuation of the second actuating element moves into the second portion.

15. The vehicle seat according to claim 10, wherein the activation element is elastically biased with respect to the coupling element by a spring.

16. The vehicle seat according to claim 10, wherein for shifting the control lever into the passive position the activation element is actuated by the third connecting means of the coupling element and resetting into the active position is effected by action of the biasing spring.

17. The vehicle seat according to claim 10, wherein the activation element is operatively connected with a cam pivotable about a pivot axis, wherein on pivoting for shifting the control lever between its active position and its passive position the cam acts on the control lever.

18. The vehicle seat according to claim 10, wherein in a cargo position, in which the backrest part is pivoted into a position folded forwards towards the seat part, the control lever is in the passive position and is blocked by a blocking surface of the driving stop such that the control lever cannot be brought into its active position.

* * * * *